United States Patent [19]
Schneider

[11] Patent Number: 6,056,267
[45] Date of Patent: May 2, 2000

[54] ISOLATION VALVE WITH EXTENDED SEAL LIFE

[75] Inventor: Gerhard Schneider, Cupertino, Calif.

[73] Assignee: Applied Materials, Inc., Santa Clara, Calif.

[21] Appl. No.: 09/081,417

[22] Filed: May 19, 1998

[51] Int. Cl.[7] .................................................. F16K 3/18
[52] U.S. Cl. .......................... 251/204; 251/193; 251/196
[58] Field of Search ................................ 251/158, 193, 251/196, 199, 203, 204, 167

[56] References Cited

U.S. PATENT DOCUMENTS

| | | | |
|---|---|---|---|
| 2,150,254 | 3/1939 | Sorensen | 251/196 X |
| 2,192,331 | 3/1940 | Schaefer | 251/196 X |
| 2,776,105 | 1/1957 | Schmitz | 251/199 |
| 3,554,486 | 1/1971 | Thebado | 251/204 |
| 3,557,822 | 1/1971 | Chronister . | |
| 3,765,647 | 10/1973 | Grove et al. . | |
| 4,359,203 | 11/1982 | Cho | 251/167 X |
| 4,524,796 | 6/1985 | Ayers, Jr. et al. | 251/204 X |
| 4,664,139 | 5/1987 | Pfeiffer . | |
| 4,895,342 | 1/1990 | Feild . | |
| 5,232,199 | 8/1993 | Thrasher . | |
| 5,368,276 | 11/1994 | Pfeiffer . | |
| 5,579,718 | 12/1996 | Freerks . | |

*Primary Examiner*—John Fox
*Attorney, Agent, or Firm*—Thomason, Moser & Patterson

[57] ABSTRACT

A gate valve assembly having a primary and secondary seating surface for preventing process fluids from contacting the seals of the valve is provided. Additionally, a purge gas inlet can be disposed in the valve body to prevent process gases from contacting the seals during operation. Still further, a primary and secondary barrier seal may be provided to prevent process gases from contacting the primary seal. Additionally, a purge gas inlet can be disposed between the primary and secondary seals to further prevent process gases from contacting the primary seal.

28 Claims, 6 Drawing Sheets

ISOLATION VALVE WITH EXTENDED SEAL LIFE

BACKGROUND OF THE INVENTION

1. Field of the Invention

The present invention relates to a valve assembly for sealing an opening in a processing system. More particularly, the invention relates to a valve assembly which prevents exposure of the seals incorporated in the valve assembly to the process environment.

2. Background of the Related Art

In the fabrication of integrated circuits and flat panel displays, various processing chambers and systems are employed to perform multiple deposition and etch processes on substrates to form electronic devices. Examples of some processes include chemical vapor deposition, physical vapor deposition and various etch processes performed in processing systems using volatile and corrosive gases. The corrosive gases typically attack the exposed chamber components including o-ring seals found in valves disposed in exhaust lines connecting vacuum pumps to the processing systems.

Figure 1:
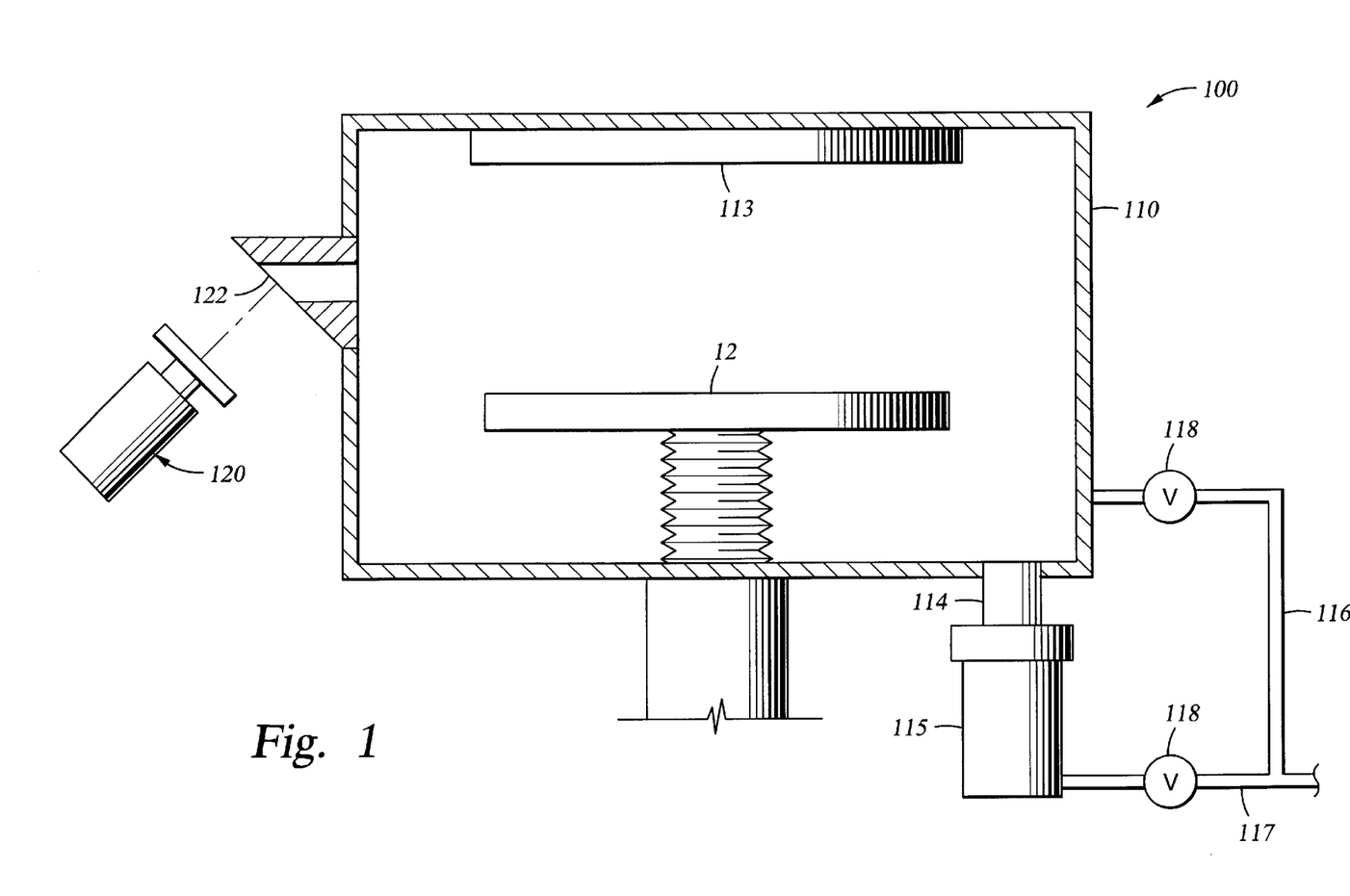
FIG. 1 is a cross sectional schematic view of a chamber.

FIG. 1 is a schematic cross sectional view of a processing chamber 100 showing a chamber body 110 housing a substrate support member 112, and having a gas distribution assembly 113, a turbo pump 115 (or some other high vacuum pump) located below an exhaust outlet 114, and a by-pass line 116. One or more valves 118 are typically disposed on an exhaust line 117 and the by-pass line 116 to control chamber pressure during processing and to stabilize the system when a substrate is not positioned for processing. A slit valve assembly 120 selectively opens and closes an aperture 122 through which substrates are transferred.

Typically, gate valves or other type valves 118 disposed in the exhaust lines 117 and by-pass lines 116 have exposed o-ring seals when the gate valve is in the open position. As a result, the volatile and corrosive gases contact the seals. The seals currently used are susceptible to attack from these gases and continual exposure requires frequent replacement of the seals, resulting in increased operating costs and decreased throughput.

Therefore, there is a need for a valve assembly that prevents exposure of the valve seals to the corrosive gases during operation of the valve.

SUMMARY OF THE INVENTION

The invention generally provides a valve assembly comprising a first and a second seating surface for receiving a valve door during an opened and a closed position. A displacement assembly seals the valve door adjacent each of the seating surfaces during operation of the valve.

In one embodiment, a wedge assembly urges the valve door laterally towards the seating surfaces as the door contacts a stop disposed in both the upper and lower portion of the valve body.

In another embodiment, a valve door comprising a first and a second plate is provided. Each plate defines one or more recesses corresponding to one or more recesses or detentes formed on the other plate. A ball bearing is disposed between the plates in each mating detente to urge the valve door laterally when the door reaches a stop disposed in the valve body. Preferably, the détentes are conical in shape to define an inclined plane on which the ball bearing moves to urge the sealing plate laterally.

In still another embodiment, a rotary valve is provided having an actuating rotary shaft and a sealing plate or door mounted thereon. The shaft includes an angled interface where an upper portion and a lower portion mate to rotate and elevate the sealing plate. On rotation of the shaft, the sealing plate rotates into position over either a primary or a secondary seating surface and contacts a stop positioned within the valve body adjacent the opened and closed position. As the sealing plate contacts the stop, the shaft continues to rotate, thereby urging the sealing plate towards the second seating surface.

In another embodiment, a seal assembly is provided on a valve door that includes a primary seal and a secondary barrier seal to prevent process gases from contacting the primary seal. A purge gas inlet may be disposed between the primary seal and the secondary barrier seal to enhance protection of the primary seal.

DESCRIPTION OF A PREFERRED EMBODIMENT

The invention generally provides a new isolation valve assembly which prevents contact between the o-ring seals and the process gases when the valve is in the opened position to provide extended seal life. In one embodiment, a valve assembly is provided which seals a valve door adjacent a primary seating surface during a closed position and which seals the valve door adjacent a secondary seating surface during an opened position. In another embodiment, a purge gas channel is disposed through a valve body between a primary seal and a secondary barrier seal to deliver a purge gas adjacent to the o-ring seals to further prevent contact between the process gases and the primary seal. The invention will be described in detail below with reference to several embodiments.

Figure 2:
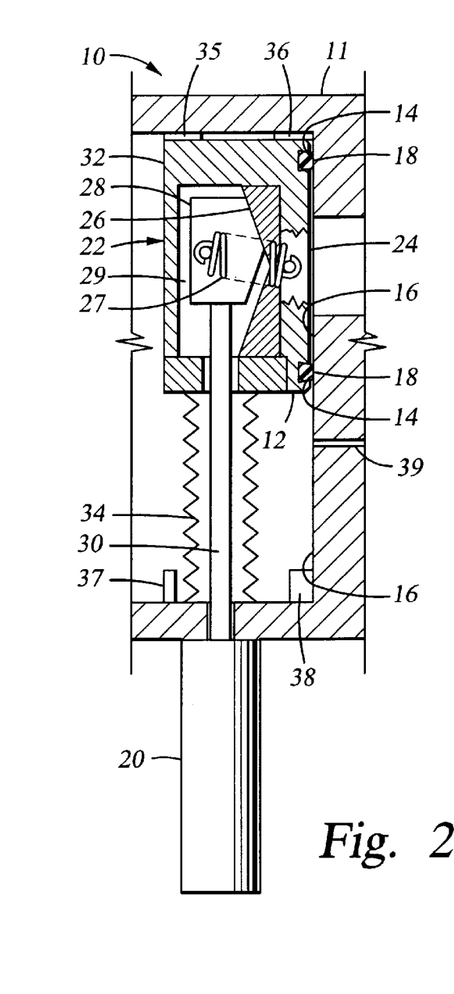
FIGS. 2–4 are partial cross sectional views of a first embodiment of a valve of the invention.

FIG. 2 is a partial cross sectional view of a first embodiment of a valve assembly 10 comprising a valve body 11 having a valve door 12 disposed therein, a primary seating surface 14, and secondary seating surface 16. The primary and secondary seating surfaces 14 and 16 are disposed on the valve body. One or more o-ring seals 18 are disposed around a seating surface 24 of the valve door 12 to form an airtight seal between the valve door 12 and the primary seating surface 14. An actuator 20 and a displacement assembly 22 are provided to effect opening, closing, and seating of the valve door 12 at both the primary 14 and secondary seating surfaces 16. The valve door 12 includes a contoured back actuating surface 26 which is selectively engaged by a wedge member 28 connected by a rod 30 to the actuator 20. The wedge member 28 is held in sliding abutment with the back actuating surface 26 by a spring 27 (shown partly in phantom to reveal other features of the invention). A shield 32, extending beyond the back surface 26, and a bellows 34, form an enclosure 29 which is sealed from the internal valve body 11. The actuating rod 30 is disposed through the valve body 11 at the lower portion of the valve body 11 and is enclosed by the bellows 34 to prevent contamination of the interior of the valve body 11.

The displacement assembly 22 moves the valve door 12 both vertically and horizontally within the valve body 11 through contact between the back actuating surface 26 and the front surface of the wedge member 28. The actuator 20 drives the actuating rod 30 to move the valve door 12 in the valve body 11. The actuator 20 can be of any type such as a pneumatic cylinder or a stepper motor or other electric motor. The valve door 12 is moved in an up and down direction until the door contacts a first pair of stops 35 and 36 when fully extended and a second pair of stops 37 and 38 when fully retracted. The displacement assembly 22 then moves the valve door 12 into a seated position at either the primary 14 or secondary seating surface 16 (depending on the direction of movement of the valve door 12) on continued movement of the actuating rod 30 in the valve body 11. The first pair of stops 35 and 36 and the second pair of stops 37 and 38 are disposed at the upper and lower ends of the valve body 11, respectively, to define the length of the door's movement, i.e., its range of vertical displacement. The horizontal displacement is defined by the desired horizontal compression of the o-ring 18.

A purge gas channel 39 is formed in the valve body 11 to deliver a purge gas into the interstitial space between the valve door 12 and the secondary seating surface 16. The purge gas provides additional protection to the o-ring 18 by diluting process gases which penetrate the o-ring seal 18 and migrate into the interior environment of the valve assembly 10.

Figure 3:
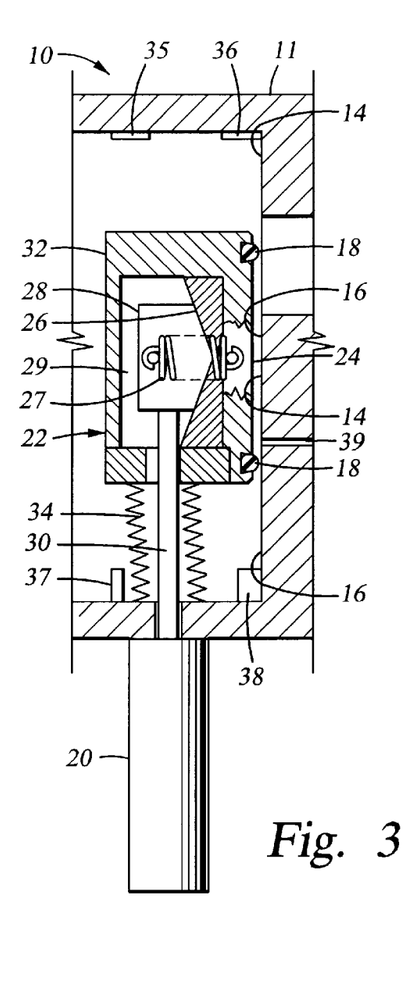
Figure 4:
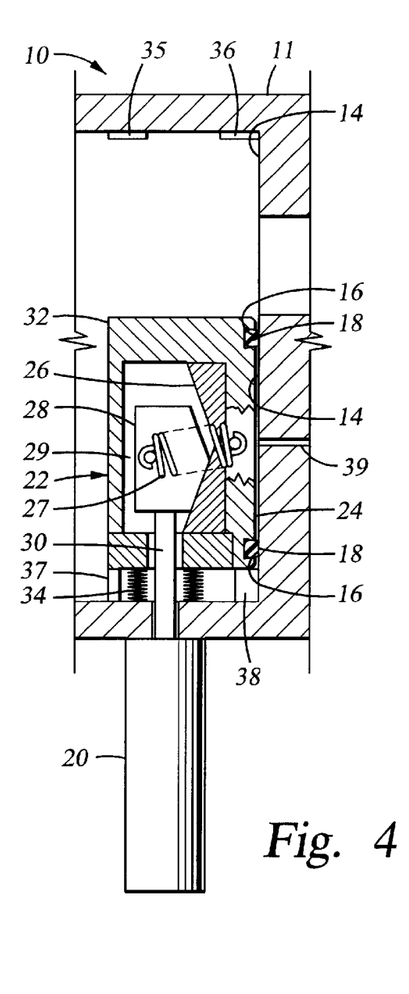

The sequence of operation of this embodiment is shown FIGS. 2–4. As shown in FIG. 2, the valve door 12 is shown in the closed position where the valve door 12 is seated against the primary seating surface 14 and the valve door 12 is sealed to prevent movement of gases through the valve body 11. In this position the wedge member 28 is shown resting on an upper ramped portion of the back seating surface 26. FIG. 3 shows the valve door 12 moving from the closed position into the opened position. As the actuating rod 30 moves downwardly in the valve body 11, the displacement assembly 22 releases the valve door 12 from the seated position into a freely movable position within the valve body 11. The spring acts to lift the valve door 12 from the first seating surface 14 thereby preventing friction with the o-ring 18. As the valve door 12 moves downwardly in the valve body 11, the door 12 contacts the second pair of stops 37 and 38. The actuating rod 30 continues to move downward along a lower ramped portion of the back seating surface 26 until the valve door 12 is moved laterally into a seated position against the secondary seating surface 16 as shown in FIG. 4. To close the valve door 12, the steps are reversed, thereby sealing the valve door 12 against the primary seating surface 14.

Figure 5:
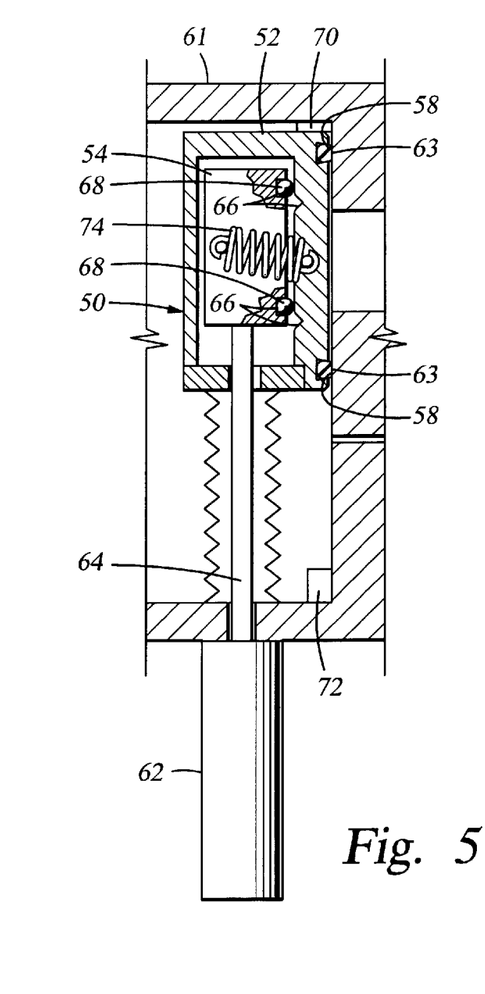
FIGS. 5–7 are partial cross sectional views of a second embodiment of a valve of the invention.
Figure 6:
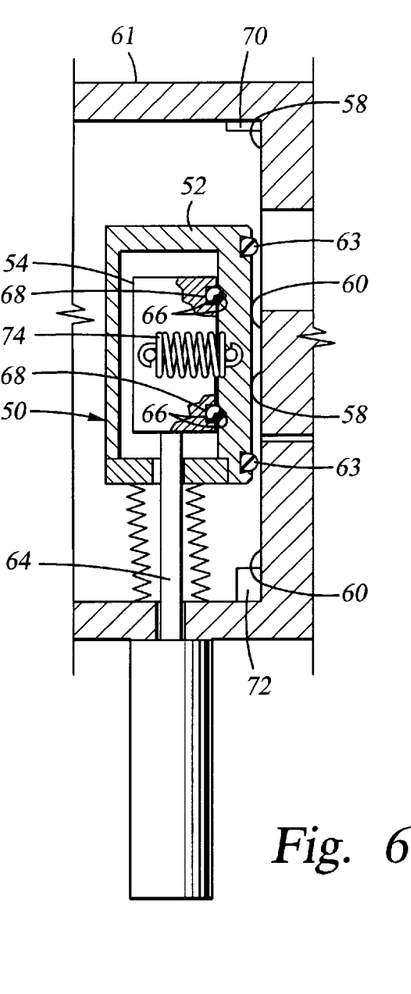
Figure 7:
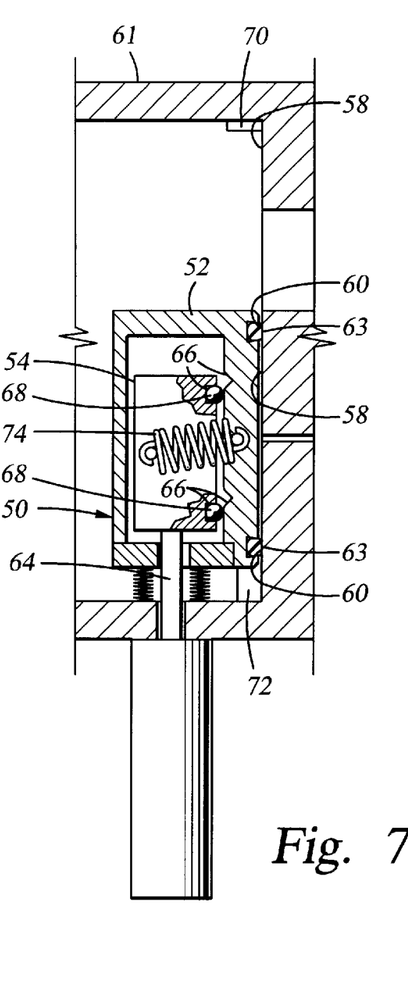

In another embodiment shown in FIGS. 5–7, a valve door assembly 50 is connected to a displacement assembly 56 disposed between two sliding plates 52 and 54. A first sealing plate 52 is provided for engaging the primary seating surface 58 and secondary 60 seating surface similar to the first embodiment. A secondary plate 54 is disposed in a parallel arrangement with the first sealing plate and is connected to an actuator 62 by an actuating rod 64. One or more matching détentes 66 are formed on the adjacent surfaces of the first 52 and second sealing plates 54. One or more ball bearings 68 are disposed between the two plates 52, 54 in the matching détentes 66 to engage the surfaces of the detentes 66 and selectively urge the first plate 52 into engagement with the first 58 and second seating surfaces 60. Stops 70 and 72 are disposed in the upper and lower portions of a valve body 61, respectively, to define the movement of the first sealing plate 52 and to define the point where the displacement assembly 56 urges the sealing plate 52 towards a seated position at either the primary 58 or secondary seating surfaces 60. A spring 74 is connected between the first and second plates 52 and 54 to hold the plates 52, 54 together during vertical movement and to enable separation of the plates 52, 54 as the sealing plate 52 contacts one of the stops 70, 72.

A purge gas channel 71 is formed in the valve body 61 to deliver a purge gas into the interstitial space between the valve door 50 assembly and the secondary seating surface 60. The gas provides additional protection to an o-ring 63 from the process gases.

In operation from the closed position to the opened position, the actuator 62 moves downwardly thereby moving the ball bearings 68 into a matching recess formed by the détentes 66 disposed in both the first 52 and second plates 54. As the ball bearings 68 move into the recesses, the spring 74 moves the sealing plate 52 laterally away from the seat 58 towards the second plate 54 for movement in the valve body 61 as shown in FIG. 6. The door assembly 50 moves downward in the valve body 61 until the sealing plate 52 contacts the stop 72. As the second plate 54 continues, the ball bearings 68 engage the angled surfaces of the détentes 66 formed in the sealing plate 52 to urge the sealing plate 52 laterally against the secondary seating surface 60 as shown in FIG. 7.

Figure 8:
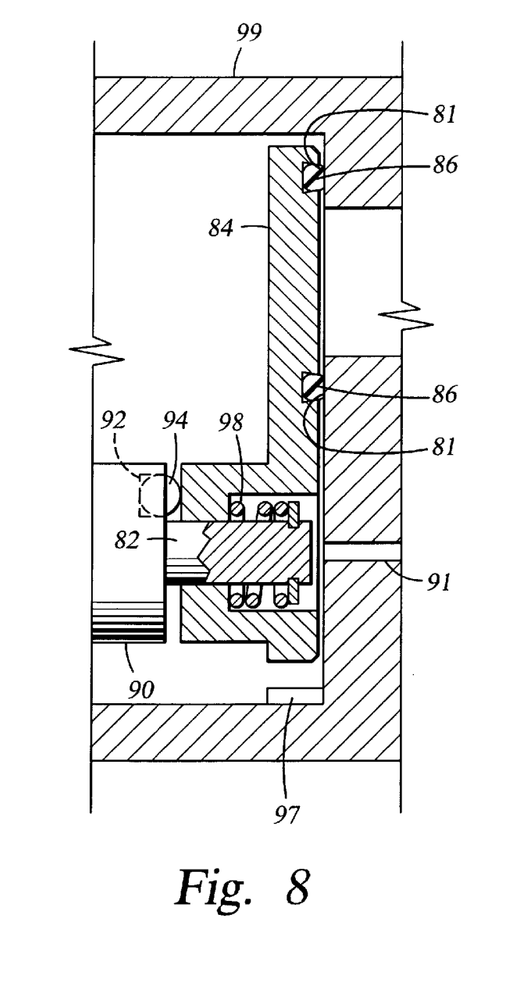
FIGS. 8–10 are partial cross sectional views of a third embodiment of a valve of the invention.
Figure 9:
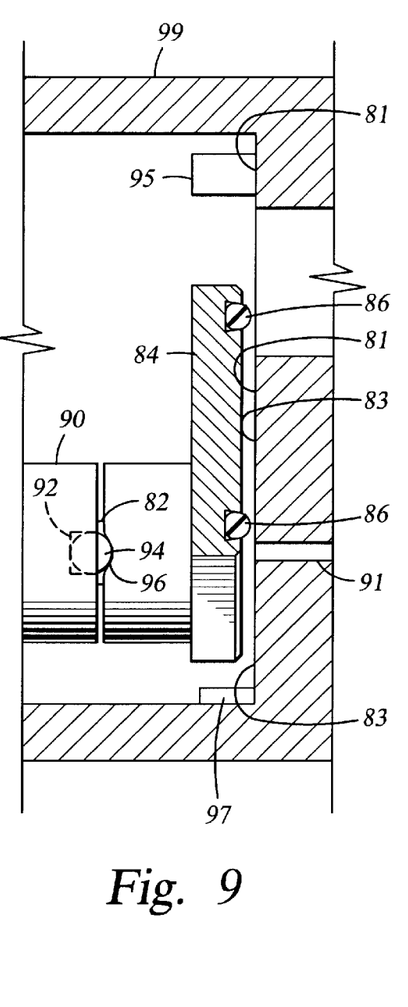
Figure 10:
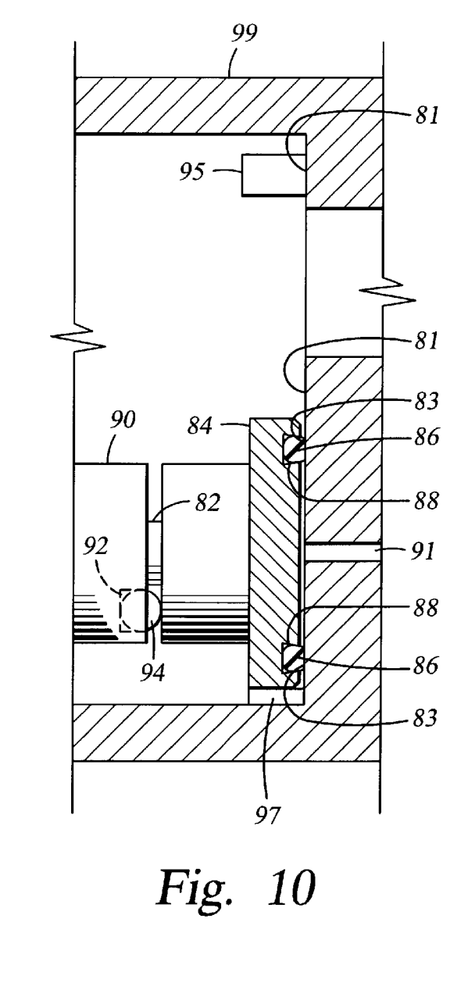

In still another embodiment, a rotary valve assembly is provided to selectively seal an opening at a primary seating surface and to engage a sealing plate onto a secondary seating surface in the opened position. FIGS. 8–10 are cross sectional schematic views showing a rotary valve assembly 80 having an axial shaft 82 connected on one end to a rotary actuator (not shown) and on a second end to a sealing plate 84. The sealing plate 84 includes one or more o-rings 86 disposed in one or more recesses 88 in the seating face of the plate 84. A purge gas delivered via a gas channel 91 protects the o-rings 86 while the sealing plate 84 is disposed on a primary seating surface 81. A base assembly 90 is disposed at least partially in a valve body 99 and includes a channel 92 which houses a ball bearing 94 to seat the plate 84. A second channel 96 is formed in the flange of the sealing plate to receive the ball bearing 94 on rotation of the shaft 82 to release the sealing plate 84 from the seated position. A pair of stops 95, 97 are disposed in the valve body 99 at a location to stop rotation of the sealing plate 84 when the sealing plate 84 is disposed over either the primary 81 seating surface or a secondary seating surface 83. On rotation of the shaft 82 from the closed position, the sealing plate 84 rotates and the ball bearing 94 moves into the channel 96 on the sealing plate so that a spring 98, coupled to the shaft 82 and plate 84, urges the sealing plate 84 away from a primary seating surface 81 to freely rotate in the valve body 99 until stop 97 is contacted. During the continued rotation of the shaft 82 the ball bearing 94 moves out of the channel 96 to urge the sealing plate 84 into a seated position over a secondary seating surface 83.

Figure 11A:
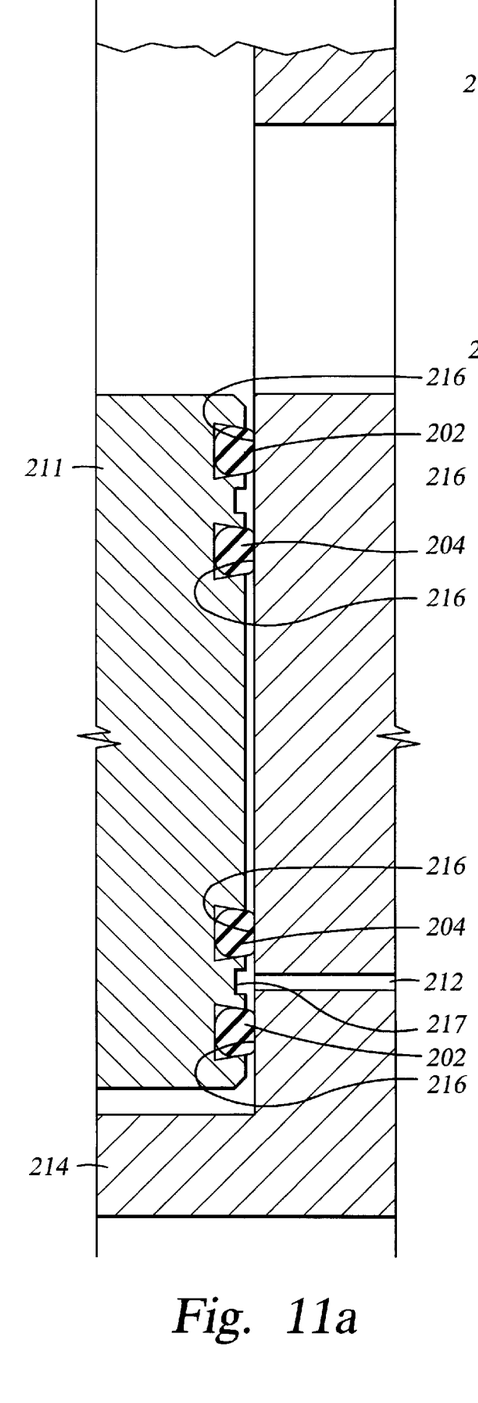
FIGS. 11a and 11b are cross sectional views of fourth embodiment of a valve of the invention.
Figure 11B:
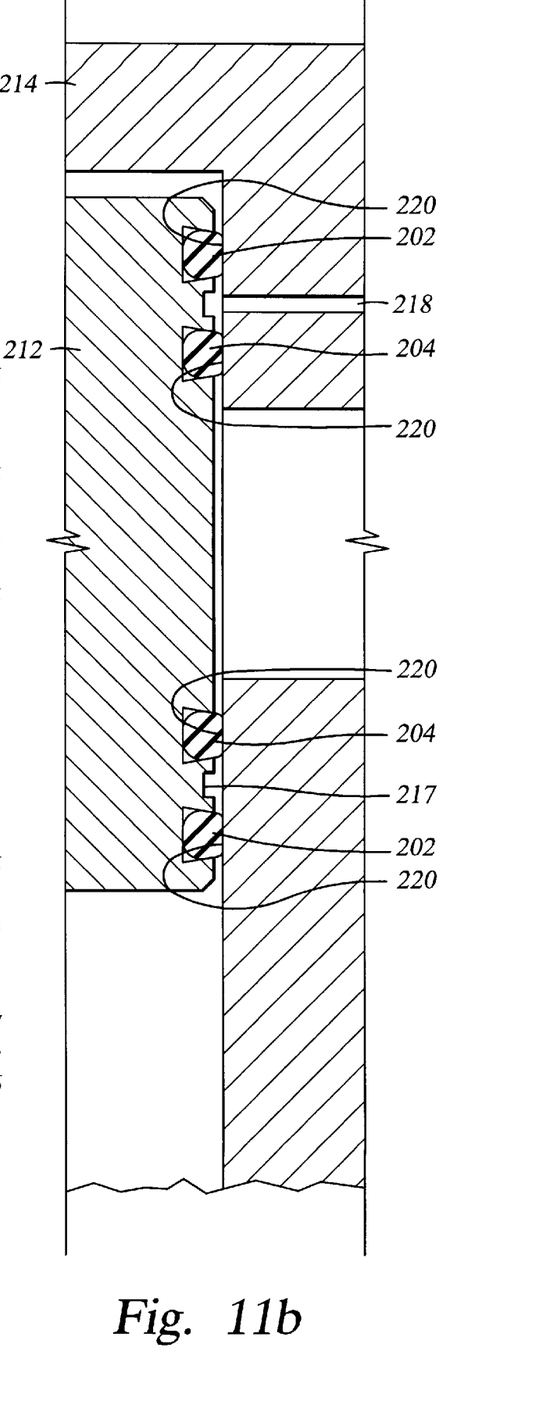
Figure 12A:
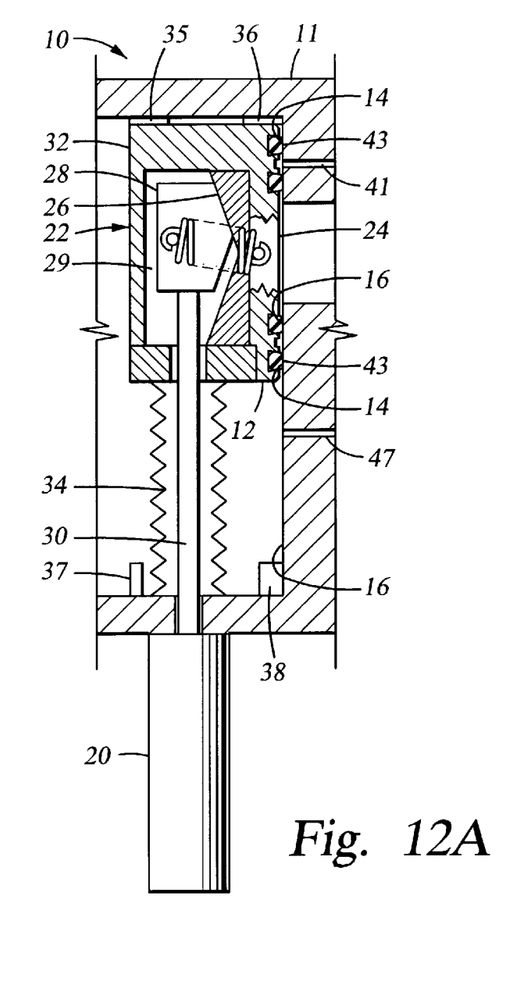
FIGS. 12a and 12b are cross sectional views of the first embodiment incorporating two purge gas channels and two seals.
Figure 12B:
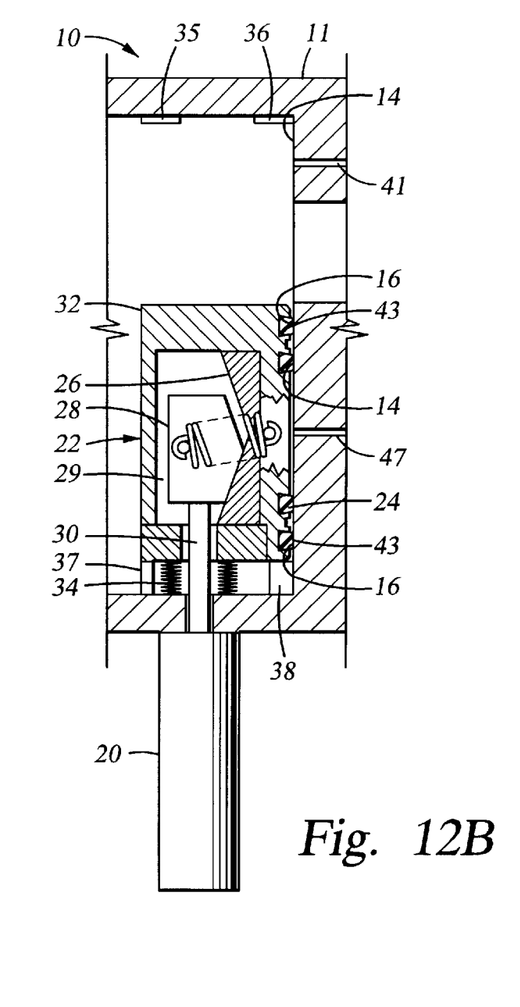

In still another embodiment, shown in FIGS. 11a and 11b, each of the valve bodies described above may include a primary seal and a barrier seal with a purge gas channel disposed therebetween. The barrier seal is preferably disposed between the primary seal and the source of the process gases from which exposure is sought to be prevented. In the embodiment shown in FIG. 11a, a pair of o-ring seals, a primary seal 202 and a barrier seal 204, are disposed on a valve door 211 and a purge gas channel 212 is disposed through a valve body 214 at a location between the two seals 202, 204 when the seals are seated against a secondary surface 216. An annular gas pathway 217 is formed in the valve door 211 to provide uniform distribution of the gas between the seals 202, 204. Alternatively, or additionally, a purge gas inlet 218 may be similarly situated at a location between the seals 202, 204 when the valve door 211 is in a primary seating position 220 as shown in FIG. 11b. A gas source (not shown) is connected to the gas inlet 218 to provide a purge gas adjacent to the primary 202 and barrier seals 204. In operation, a purge gas is delivered at a rate sufficient to prevent process gases from entering the area adjacent at least the primary seal 202. The purge gas may be provided with sufficient pressure to flow past the barrier seal 204 and into the gas stream flowing through an exhaust channel 221. As in the previous embodiments, the purge gas also dilutes process gases which overcome the pressure barrier provided by the purge gas, thereby mitigating the deleterious effects of the process gas. As an example of the embodiments depicted in FIGS. 11a and 11b, FIG. 12a and 12b show the first embodiment of the present invention incorporating a first purge gas channel 41 delivering a gas to seals 43, 45 disposed on the primary seating surface 14 and a second purge gas channel 47 delivering a gas to seals 43, 45 disposed on the secondary seating surface 16.

While the foregoing is directed to the preferred embodiment of the present invention, other and further embodiments of the invention may be devised without departing from the basic scope thereof. The scope of the invention is determined by the claims which follow.

I claim:

1. A valve assembly, comprising:
   a) a valve body defining a passage therethrough;
   b) a valve door disposed at least partially in the valve body for selectively sealing the passage defined by the valve body;
   c) a first seating surface for receiving the valve door to seal the passage in the valve body;
   d) a second seating surface for receiving the valve door when the passage in the valve body is at least partially open; and
   e) an actuating assembly for seating the valve door on the first or second seating surface, wherein at least one of the seating surfaces on the valve body comprises a purge gas passage.

2. The valve assembly of claim 1 wherein the actuating assembly comprises a pneumatic cylinder for moving the valve door.

3. The valve assembly of claim 2 wherein the valve door comprises a seating surface and an actuating surface, the actuating surface having a tapered portion for selectively contacting a portion of the actuating assembly to selectively seal the valve door against the first and second seating surface.

4. The valve assembly of claim 3 wherein the actuating assembly further comprises a rod connected to the pneumatic cylinder, the rod mounting an actuating wedge.

5. The valve assembly of claim 4 wherein the valve door further comprises one or more seals disposed on the seating surface thereof.

6. The valve assembly of claim 5 wherein the second seating surface comprises the purge gas passage.

7. The valve assembly of claim 6 wherein the valve door further comprises a housing enclosing the actuating wedge, the housing having an internal actuating surface.

8. The valve assembly of claim 7 further comprising a bellows to isolate the rod and actuating wedge from the interior of the valve body.

9. The valve assembly of claim 7 further comprising two or more stops located at an upper and lower end of the valve body which terminate the valve door's movement between the first and second seating surfaces.

10. The valve assembly of claim 2 wherein the valve door comprises a first and a second sliding plate coupled by a spring.

11. The valve assembly of claim 10 wherein the actuating assembly further comprises a rod connected to the pneumatic cylinder, the rod mounting the second plate.

12. The valve assembly of claim 11 further comprising one or more ball bearing disposed in one of either the first or second plates and bearing against the other plate, the other plate having one or more detentes formed therein for selectively receiving the one or more ball bearings.

13. The valve assembly of claim 12 wherein the valve door further comprises one or more seals disposed on the seating surface.

14. The valve assembly of claim 13 wherein the second seating surface comprises the purge gas passage.

15. The valve assembly of claim 14 further comprising two or more stops located at an upper and lower end of the valve body which terminate the valve door's movement between the first and second seating surfaces.

16. The valve assembly of claim 1 wherein the valve door comprises a sealing plate and a base assembly, the base assembly being coupled to the actuating assembly.

17. The valve assembly of claim 16 wherein the actuating assembly comprises a rotary actuator to selectively rotate the base assembly and the sealing plate.

18. The valve assembly of claim 17 wherein the base assembly houses one or more ball bearings, the one or more ball bearings abutting the sealing plate.

19. The valve assembly of claim 18 wherein channels adapted to selectively receive the one or more ball bearings are formed on the sealing plate.

20. The valve assembly of claim 19 wherein the valve door further comprises one or more seals disposed on the seating surface.

21. The valve assembly of claim 20 wherein the second seating surface comprises the purge gas passage.

22. The valve assembly of claim 21 further comprising two or more stops located at an upper and lower end of the valve body which terminate the valve door's movement between the first and second seating surfaces.

23. A valve assembly, comprising:
a) a valve body defining a passage therethrough;
b) a valve door disposed at least partially in the valve body for selectively sealing the passage defined by the valve body, the valve door comprising a housing having an internal actuating surface;
c) a first seating surface for receiving the valve door to seal the passage in the valve body;
d) a second seating surface for receiving the valve door when the passage in the valve body is at least partially open; and
e) an actuating assembly for seating the valve door on the first or second seating surface, the actuating assembly comprising an actuating member positioned within the valve door housing.

24. The valve assembly of claim 23 wherein the actuating member selectively contacts the internal actuating surface.

25. The valve assembly of claim 24 wherein the actuating assembly further comprises a pneumatic cylinder, and a rod connecting the pneumatic cylinder and the actuating member.

26. The valve assembly of claim 25 wherein the valve door further comprises one or more seals disposed on a seating surface of the housing.

27. The valve assembly of claim 26 wherein the valve body has one or more purge gas passages.

28. The valve assembly of claim 27 wherein the actuating member is an actuating wedge.

* * * * *